United States Patent [19]

Shimada

[11] Patent Number: 4,458,640

[45] Date of Patent: Jul. 10, 1984

[54] INTERNAL COMBUSTION ENGINE WITH BEARING BEAM STRUCTURE

[75] Inventor: Kiyoshi Shimada, Yokosuka, Japan

[73] Assignee: Nissan Motor Company, Limited, Yokohama, Japan

[21] Appl. No.: 343,850

[22] Filed: Jan. 29, 1982

[30] Foreign Application Priority Data

Feb. 5, 1981 [JP] Japan .......................... 56-15183[U]

[51] Int. Cl.$^3$ .......................... F16F 15/00; F02F 1/00

[52] U.S. Cl. .......................... 123/195 H; 123/195 R; 123/198 E; 74/606 R

[58] Field of Search .......... 123/195 C, 195 R, 198 E, 123/195 H; 184/106; 74/606 R

[56] References Cited

U.S. PATENT DOCUMENTS

| | | | |
|---|---|---|---|
| 3,354,988 | 11/1967 | Leonard | 184/106 |
| 4,199,202 | 4/1980 | Maeda | 123/196 R |
| 4,245,595 | 1/1981 | Abe et al. | 123/195 C |

FOREIGN PATENT DOCUMENTS

| | | |
|---|---|---|
| 2839885 | 4/1979 | Fed. Rep. of Germany . |
| 2171539 | 9/1973 | France . |
| 632684 | 11/1949 | United Kingdom . |
| 879219 | 10/1961 | United Kingdom . |
| 2008195 | 5/1979 | United Kingdom . |

OTHER PUBLICATIONS

Schellmann, K. et al., "Der Porsche-V8-Motor Typ 928", DK 621.434.12-123, Aug. 31, 1983.

*Primary Examiner*—Craig R. Feinberg
*Assistant Examiner*—David A. Okonsky
*Attorney, Agent, or Firm*—Schwartz, Jeffery, Schwaab, Mack, Blumenthal & Koch

[57] ABSTRACT

An internal combustion engine comprises a cylinder block rigidly connected to a transmission and having cylinder bores and bearing sections; and a bearing beam structure including main bearing cap sections each associating with each cylinder block bearing section to rotatably support a crankshaft, first and second beam sections securely connecting the main bearing cap sections with each other and extending parallelly with the crankshaft axis, the first and second beam sections being located spaced from each other and along the respective opposite side portions of each bearing cap section, and first and second connecting sections respectively integral with the first and second beam sections and being rigidly connected to the transmission, thereby preventing the bearing beam structure from its axial vibration while contributing to an improvement in rigidity of a power unit entire including the transmission.

6 Claims, 6 Drawing Figures

INTERNAL COMBUSTION ENGINE WITH BEARING BEAM STRUCTURE

BACKGROUND OF THE INVENTION

1. Field of the Invention

This invention relates to a low noise level automotive internal combustion engine, and more particularly to the engine equipped with a bearing beam structure for supporting a crankshaft in a manner to improve the mechanical strength of the cylinder block.

2. Description of the Prior Art

In connection with engine noise, noise emitted from a cylinder block skirt section and an oil pan is mainly caused by the vibration of a cylinder block itself. In order to reduce such vibration noise, it would appear sufficient to suppress the vibration, due to explosion torque, applied to a crankshaft by increasing the rigidity of the cylinder block. However, this unavoidably leads to an increase in cylinder block wall thickness and accordingly to a great increase in engine weight, thereby giving rise to new problems such as reduced fuel economy. In view of this, a variety of propositions have been made to improve the rigidity of the cylinder block while suppressing the increase in cylinder block weight. Of these propositions, attention has been paid to the employment of a bearing beam structure which securely connects a plurality of bearing caps for supporting the crankshaft, in order to improve the mechanical strength of bearing caps and engine parts associated with them.

BRIEF SUMMARY OF THE INVENTION

In accordance with the present invention, an internal combustion engine comprises a cylinder block which is rigidly connected to a transmission and has cylinder bores and bearing sections. A bearing beam structure is secured to the bottom part of the cylinder block and includes main bearing cap sections each of which associates with a cylinder block bearing section to rotatably support the journal of a crankshaft. The bearing beam structure further includes first and second beam sections which are disposed to securely connect the main bearing cap sections with each other. The first and second beam sections extend parallel with the axis of the crankshaft, and are located spaced from each other and along the respective opposite portions of each bearing cap section. The first and second beam sections are rigidly connected respectively through first and second connecting sections with the transmission. With the thus arranged engine, the bearing beam structure is prevented from vibrating in the crankshaft axis direction, while contributing to an improvement in rigidity of a whole power unit including the transmission, thereby effectively decreasing vibration noises emitted from various engine parts.

BRIEF DESCRIPTION OF THE DRAWINGS

The features and advantages of the internal combustion engine according to the present invention will be more appreciated from the following description taken in conjunction with the accompanying drawings in which like reference numerals and characters designate like parts and elements, in which.

DETAILED DESCRIPTION OF THE INVENTION

Figure 1:
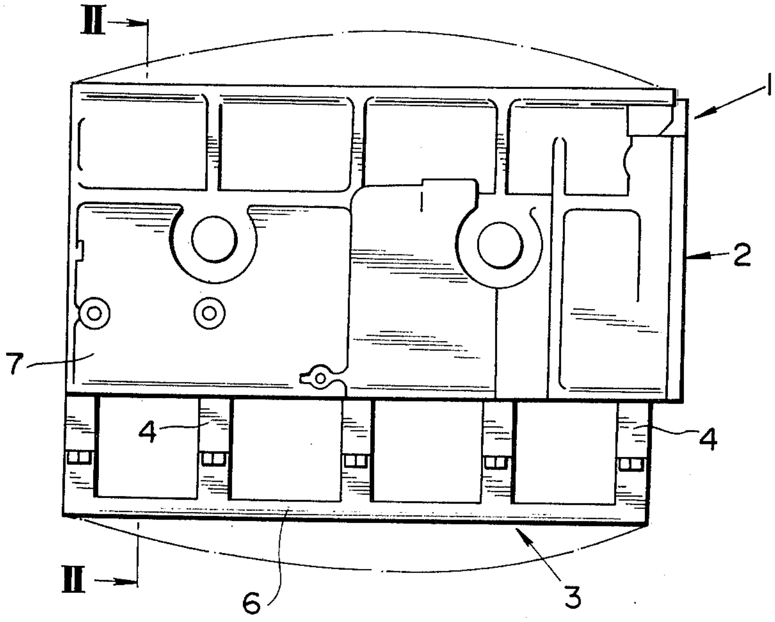
FIG.1 PRIOR ART
FIG. 1 is a front elevation of a conventional internal combustion engine.
Figure 2:
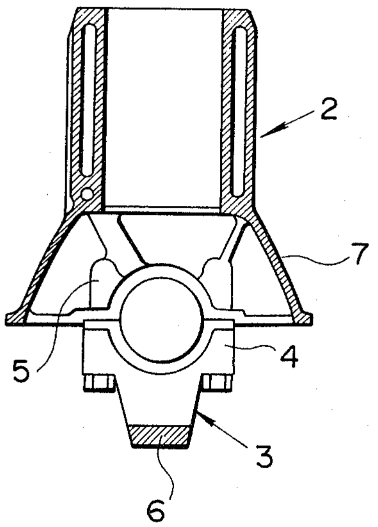
FIG.2 PRIOR ART
FIG. 2 is a vertical sectional view taken in the direction of arrows substantially along the line II—II of FIG. 1.
Figure 3:
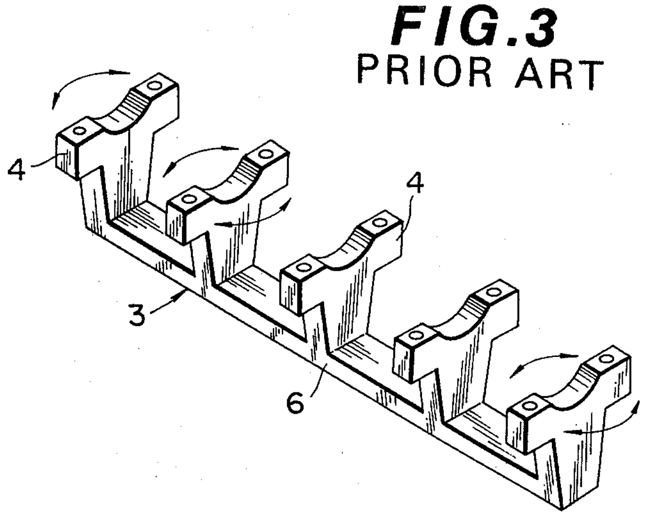
FIG.3 PRIOR ART
FIG. 3 is a perspective view of a conventional bearing beam structure used in the engine of FIG. 1.

To facilitate understanding the invention, a brief reference will be made to an engine block 1 of a conventional automotive internal combustion engine, depicted in FIGS. 1 to 3. Referring to FIGS. 1 and 2, the engine block 1 includes a cylinder block 2, and a bearing beam structure 3 secured to the bottom part of the cylinder block 2 by means of bolts. The bearing beam structure 3 has a plurality of main bearing cap sections 4 each of which associates with a bearing sections 5 or a main bearing bulkhead of the cylinder block 2, as shown in FIG. 3. The thus associated bearing cap section 4 and cylinder block bearing section 5 rotatably support the journal of a crankshaft (not shown). The bearing cap sections 4 are securely or integrally connected with each other through a beam section 6 extending along the axis of the crankshaft, so that the rigidity of the cylinder block 2 can be increased. Therefore, the cylinder block 2 is improved in flexural rigidity against the flexural vibration indicated in phantom in FIG. 1, and the bearing cap sections 4 are also improved in flexural rigidity against the vibration in the axial direction of the crankshaft or in the forward-and-rearward direction. This vibration so acts on each bearing cap section as to cause it to come down.

As discussed above, the cylinder block 2 and the bearing cap sections 4 are improved in their mechanical strength. However, it has been confirmed that a desired engine noise reduction cannot be attained.

In this connection, my recent experiments have revealed that the lateral vibration of the cylinder block skirt section 7 is induced by the movements of bearing cap sections 4 and the bearing bulkheads 5 due to their torsional vibration around the crankshaft axis and flexural vibration in the right-and-left direction in plan or in the direction indicated by the arrows in FIG. 3. Such movements are combined with each other and excite the vibration of the cylinder block skirt section 7 and the engine oil pan. In order to suppress such vibrations, the above-mentioned conventional bearing beam structure 3 is not so effective and therefore is low in noise reduction effect for the weight increase thereof.

Figure 4:
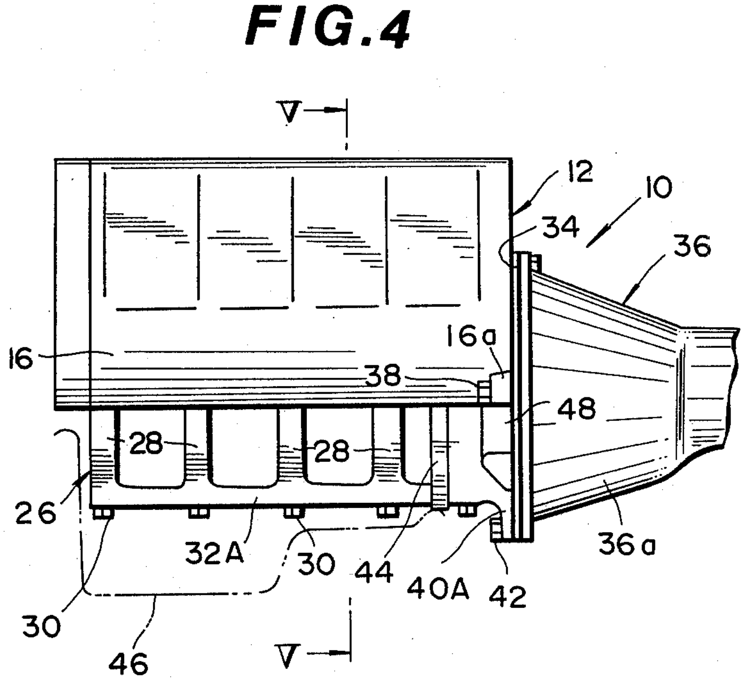
FIG. 4 is a side elevation of a preferred embodiment of an internal combustion engine in accordance with the present invention.
Figure 5:
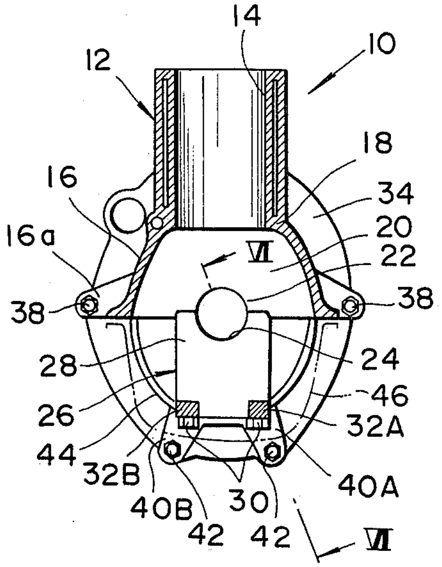
FIG. 5 is a cross-sectional view taken in the direction of arrows substantially along the line V—V of FIG. 4.
Figure 6:
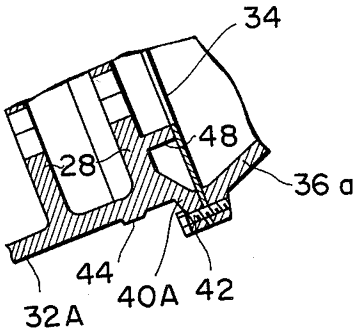
FIG. 6 is a cross-sectional view taken in the direction of arrows substantially along the line of VI—VI of FIG. 5.

In view of the above description of the automotive internal combustion engine provided with the conventional bearing beam structure, reference is now made to FIGS. 4 to 6, wherein a preferred embodiment of an internal combustion engine of the present invention is illustrated by the reference numeral 10. The engine 10 in this embodiment is for an automotive vehicle and comprises a cylinder block 12 which is formed with a plurality of cylinder barrels 14 each of which defines therein a cylinder bore (no numeral). The cylinder block 12 includes a skirt section 16 which is bulged outwardly and extends downwardly to define thereinside an upper part of a crankcase (no numeral). The skirt section 16 is integrally connected through a lower block deck 18 with the cylinder barrels 14. A plurality of main bearing bulkheads 20 are parallelly disposed inside of the the skirt section 16. Each bearing bulkhead 20 is located below and connected to a portion between the adjacent two cylinder barrels 14. The bearing bulkhead 20 is integrally connected at its top part with the lower block deck 18 and at its side parts with the inner wall of the skirt section 16. Each bearing bulkhead 20 is provided at its bottom central portion with a bearing section 22 for rotatably receiving the journal of a crankshaft (no numeral).

A bearing beam structure 26 is securely connected to the bottom section of the cylinder block 12 and includes a plurality of main bearing cap sections 28. Each bearing cap section 28 is secured at its top portion onto each bearing bulkhead 20 by means of cap bolts 30 so as to associate with the bearing section 20*a* of the bearing bulkhead 20, thereby defining a cylindrical bore 24 in which the journal of the crankshaft is rotatably supported. In this instance, the bearing cap section 28 is generally rectangular as viewed from the direction of the axis of the crankshaft or of the bore 24. The bearing cap sections 28 are connected with each other through two beam sections or members 32A, 32B each of which is, in this instance, integral with the bearing cap sections 28. The two beam sections 32A, 32B extend parallel with the crankshaft axis, and are positioned respectively at and along the bottom opposite corners of the bottom portion of each bearing cap section 28 so that each beam section is perpendicular to each bearing cap. Additionally, the beam sections 32A, 32B are located symmetrical with each other with respect to a vertical plane (not shown) containing the crankshaft axis and parallel with the axes (not shown) of the cylinder bores.

As best shown in FIG. 4, the cylinder block 12 is rigidly connected through an end plate 34 with a transmission 36. More specifically, the cylinder block skirt section 16 is integrally provided at its rear end part with oppositely disposed projections 16*a* which extend laterally outwardly. A bell housing 36*a* of the transmission 36 is connected at its upper-half with the cylinder block skirt section rear end through the skirt section projections 16*a* by means of bolts 38.

Additionally, in this embodiment, the respective rear end of the beam sections 32A, 32B extend obliquely and downward to form extended or connecting sections 40A, 40B which are continuous from and integral with the beam sections 32A, 32B, respectively. The extended sections 40A, 40B are positioned generally symmetrical with each other relative to the vertical plane containing the crankshaft axis. Each extended section 40A, 40B has a contacting surface corresponding to the rear end surface of the cylinder block 12 to which the end plate 34 contacts, and therefore the extended section contacting surface also contacts the end plate 34. Each beam section 32A, 32B is rigidly connected through this extended section 40A, 40B with the lower part of the transmission bell housing 36*a* by means of bolts 42.

Furthermore, in this instance, only the bearing cap section 28 positioned at the rear-most part of the bearing beam structure 26 is formed to be semicircular as viewed from the direction of the crankshaft axis and integrally provided along its outer periphery with a semicircular oil pan installation seat 44 to which an oil pan 46 is securely attached in order to form the crankcase which is completely closed at its rear-most end. The rear-most bearing cap section 28 is provided also with an oil seal installation seat 48 on which an oil seal for the crankshaft is securely supported or carried.

With the thus arranged internal combustion engine, by virtue of the parallelly disposed beam sections 32A, 32B, the bearing cap sections 28 are increased in strength against its coming-down vibration in the crankshaft axis direction and the torsional strength around the crankshaft axis, and additionally improved in the flexural strength around the cylinder bore axis. This greatly suppresses the torsional vibration and the flexural vibration in the right-and-left direction of the main bearing bulkheads 20 rigidly connected with the bearing cap sections 28, thereby effectively preventing the cylinder block skirt section 16 from experiencing open-and-close vibration (membrance vibration). The vibration nodes of the cylinder block skirt exist in locations where the main bearing bulkhead 20 is connected to the cylinder block skirt section 16.

Besides, the bearing beam structure 26 is rigidly connected at its lower part with the transmission 36, and therefore the bearing beam structure 26 is effectively prevented from vibration in the crankshaft axis direction or in the forward-and-rearward direction, thereby largely suppressing noise. Moreover, the cylinder block 12, the bearing beam structure 26 and the transmission 36 are rigidly connected with each other. As a result of these facts, in combination with the effect of the above-mentioned parallelly disposed beam sections 32A, 32B, the entire engine is remarkedly improved in rigidity, thereby effectively suppressing noise generation from the various parts of the engine. It is to be noted that the bearing beam structure 26 is connected to the transmission 36 through two foot-like sections (extended sections) 40A, 40B, which is particularly effective for suppressing the torsional vibration of the cylinder block 12. Thus, engine noise due the above-mentioned various vibrations is greatly lowered.

Moreover, in this instance, since the oil pan installation seat 44 and the crankshaft oil seal installation seat 48 are formed integrally with the bearing beam structure 26, the construction of sealing devices are simplified, thereby facilitating machining and assembly operation.

As is appreciated from the above, according to the present invention, the two parallelly disposed beam sections of the bearing beam structure extend to be connected with the transmission by means of bolt connection. Accordingly, the rigidity of the engine entire is further improved, thereby greatly reducing engine noise.

What is claimed is:

1. An internal combustion engine associated with a transmission having a bell housing, comprising:

a cylinder block rigidly connected to the transmission and having cylinder bores and bearing sections; and a bearing beam structure secured to the bottom part of said cylinder block and including:

main bearing cap sections each of which associates with one of said cylinder block bearing sections to rotatably support the journal of a crankshaft, first and second beam sections, spaced from said cylinder block and disposed to securely connect said main bearing cap sections with each other, said first and second beam sections extending parallel with the axis of said crankshaft, and being located spaced from each other and along respective opposite side portions of each bearing cap section, said first and second main beam sections being connected directly to said opposite side portions of each bearing cap section, and first and second projecting connecting sections being spaced apart and located on opposite sides of said crankshaft respectively, integral with said first and second beam sections and being rigidly connected, respectively, only to lower portions of a peripheral section of said bell housing of the transmission, which peripheral section defines a bell mouth, said lower portions of said bell housing peripheral section being spaced from said cylinder block.

2. An internal combustion engine as claimed in claim 1, wherein each of said first and second connecting sections is formed with a contacting surface through which the connecting section is connected through an end plate with said transmission bell housing, said contacting surface corresponding to a rear end face of said cylinder block which face contacts with said end plate.

3. An internal combustion engine as claimed in claim 1, wherein said bearing cap sections are aligned and disposed parallel with each other, each bearing cap section having a top portion contacting said cylinder block bearing section, and a bottom portion located opposite to said top portion, wherein said first and second beam sections are positioned at and along the opposite corners of said bottom portion of each bearing cap section.

4. An internal combustion engine as claimed in claim 3, wherein said first and second beam sections are located symmetrical with each other with respect to a vertical plane containing the axis of the crankshaft and parallel with the axes of said cylinder bores.

5. An internal combustion engine as claimed in claim 1, wherein said bearing cap section located at a rearmost part of said bearing beam structure is formed to be generally semicircular and integrally provided with a semicircular seat section onto which an oil pan is securely connected.

6. An internal combustion engine as claimed in claim 5, wherein said bearing cap section is integrally provided with an oil seal seat section onto which an oil seal for the crankshaft is securely supported.

* * * * *